United States Patent
Gschwind (10) Patent No.: US 9,235,344 B2
(45) Date of Patent: *Jan. 12, 2016

(54) IDENTIFYING REDUNDANT DATA FOR DISK IMAGE STREAMING

(71) Applicant: International Business Machines Corporation, Armonk, NY (US)

(72) Inventor: Thomas Gschwind, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/687,827

(22) Filed: Nov. 28, 2012

(65) Prior Publication Data

US 2014/0149659 A1    May 29, 2014

(51) Int. Cl.
*G06F 3/06* (2006.01)
*G06F 12/02* (2006.01)

(52) U.S. Cl.
CPC .............. *G06F 3/0614* (2013.01); *G06F 3/064* (2013.01); *G06F 3/067* (2013.01); *G06F 3/0608* (2013.01); *G06F 3/0677* (2013.01); *G06F 12/0246* (2013.01); *G06F 3/0659* (2013.01); *G06F 2212/7205* (2013.01)

(58) Field of Classification Search
CPC ....... G06F 3/0614; G06F 3/064; G06F 3/067; G06F 3/0677; G06F 3/0608; G06F 3/0659; G06F 12/0246; G06F 2212/7205
See application file for complete search history.

(56) References Cited

U.S. PATENT DOCUMENTS

| | | | | |
|---|---|---|---|---|
| 6,108,697 | A  * | 8/2000  | Raymond et al. | 709/218 |
| 8,307,187 | B2 * | 11/2012 | Chawla et al.  | 711/173 |
| 2012/0054746 | A1 * | 3/2012 | Vaghani et al. | 718/1 |
| 2012/0059976 | A1 * | 3/2012 | Rosenband et al. | 711/103 |
| 2014/0013059 | A1 * | 1/2014 | Joshi et al. | 711/144 |
| 2014/0074782 | A1 * | 3/2014 | Green et al. | 707/620 |

OTHER PUBLICATIONS

Sang-Hoon Kim, Jin-Soo Kim, Seungryoul Maeng, Using Solid-State Drives (SSDs) for Virtual Block Devices, Mar. 2012.*
Stuart, Lack of Trim/Discard within VMWS, Jun. 2012, http://www.lifeofstu.com/?p=75.*
Donuts, Ticket #5629 "Add option to have emulated hard disk report itself as an SSD, and support TRIM", 2009.*

* cited by examiner

*Primary Examiner* — Matthew Bradley
*Assistant Examiner* — Rocio Del Mar Perez-Velez
(74) *Attorney, Agent, or Firm* — Cantor Colburn LLP; Daniel Morris (57) ABSTRACT

Redundant data in a streaming disk image is identified using commands to indicate unused disk blocks, such as TRIM/UNMAP commands. A TRIM/UNMAP layer is added between an operating system and a disk driver to support the use of TRIM/UNMAP commands. Using the TRIM/UNMAP layer, blocks of a streamed disk image that are unallocated by the operating system are identified. The identified unallocated blocks are streamed to a server for analysis and storage.

20 Claims, 6 Drawing Sheets

IDENTIFYING REDUNDANT DATA FOR DISK IMAGE STREAMING

BACKGROUND

The present invention relates to disk image streaming, and more specifically, to providing commands to indicate unused disk blocks (such as TRIM and UNMAP commands) to identify redundant data for disk image streaming efficiency.

With the increased virtualization of computers, users typically expect their data to be accessible from all over the world. In addition to simply storing a user's data, the contemporary art can store an entire desktop disk image, including an operating system, applications and application data, in a server and synchronize the image as necessary with locally available storage. In the contemporary art, the complete disk image is typically copied or streamed from one computer to another. Although contemporary disk images have the size of an entire hard disk, only a small part of the entire disk image is actively used by the operating system. A majority of the disk image is typically unallocated or unused disk space.

SUMMARY

According to an embodiment, a computer-implemented method is provided to identify, with a processing device, redundant data in a streaming disk image using commands to indicate unused disk blocks, such as TRIM/UNMAP commands. A TRIM/UNMAP layer is added between an operating system and a disk driver to support the use of TRIM/UNMAP commands. Using the TRIM/UNMAP layer, blocks of a streamed disk image that are unallocated by the operating system are identified. The identified unallocated blocks are streamed to a server for analysis and storage.

According to another embodiment, a computer system is provided to identify, with a processing device, redundant data in a streaming disk image using commands to indicate unused disk blocks, such as TRIM/UNMAP commands. A TRIM/UNMAP layer is added between an operating system and a disk driver to support the use of TRIM/UNMAP commands. Using the TRIM/UNMAP layer, blocks of a streamed disk image that are unallocated by the operating system are identified. The identified unallocated blocks are streamed to a server for analysis and storage.

According to another embodiment, a computer program product is provided to identify, with a processing device, redundant data in a streaming disk image using commands to indicate unused disk blocks, such as TRIM/UNMAP commands. A TRIM/UNMAP layer is added between an operating system and a disk driver to support the use of TRIM/UNMAP commands. Using the TRIM/UNMAP layer, blocks of a streamed disk image that are unallocated by the operating system are identified. The identified unallocated blocks are streamed to a server for analysis and storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein identify redundant data in a streaming disk image using commands to indicate unused disk blocks (such as TRIM/UNMAP commands). A TRIM/UNMAP layer is added between an operating system and a disk driver to support the use of TRIM/UNMAP commands. Using the TRIM/UNMAP layer, blocks of a streamed disk image that are unallocated by the operating system are identified. The identified unallocated blocks are streamed to a server for analysis and storage.

The advanced technology attachment (ATA) TRIM and small computer system interface (SCSI) UNMAP commands allow an operating system to inform a solid state drive (SSD) which blocks of data are no longer considered in use. For SSDs, it is important to identify which parts of the hard disk are not used by the operating system to perform a garbage collection algorithm and restructure the SSD such that future writes to the SSD can be performed more quickly.

When streaming a disk image, disk blocks are typically transferred from a source computer to a target computer in the order they are requested by the operating system running on the target computer. In addition to transferring the blocks requested by the operating system, all other blocks of the disk image are typically transferred in the background as well. This contemporary approach downloads even those blocks of the disk image that are not used by the file system or files stored on the disk.

Embodiments of the disclosure provide TRIM and UNMAP commands to identify the unused blocks to stream disk images more efficiently. Embodiments add a TRIM/UNMAP layer above the operating system's disk driver that adds support for TRIM/UNMAP. The operating system may then issue TRIM/UNMAP commands to identify which parts of the disk are not used by the operating system. Other embodiments add the TRIM/UNMAP layer between the operating system and a virtualization infrastructure or as part of the operating system in the form of a disk driver.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
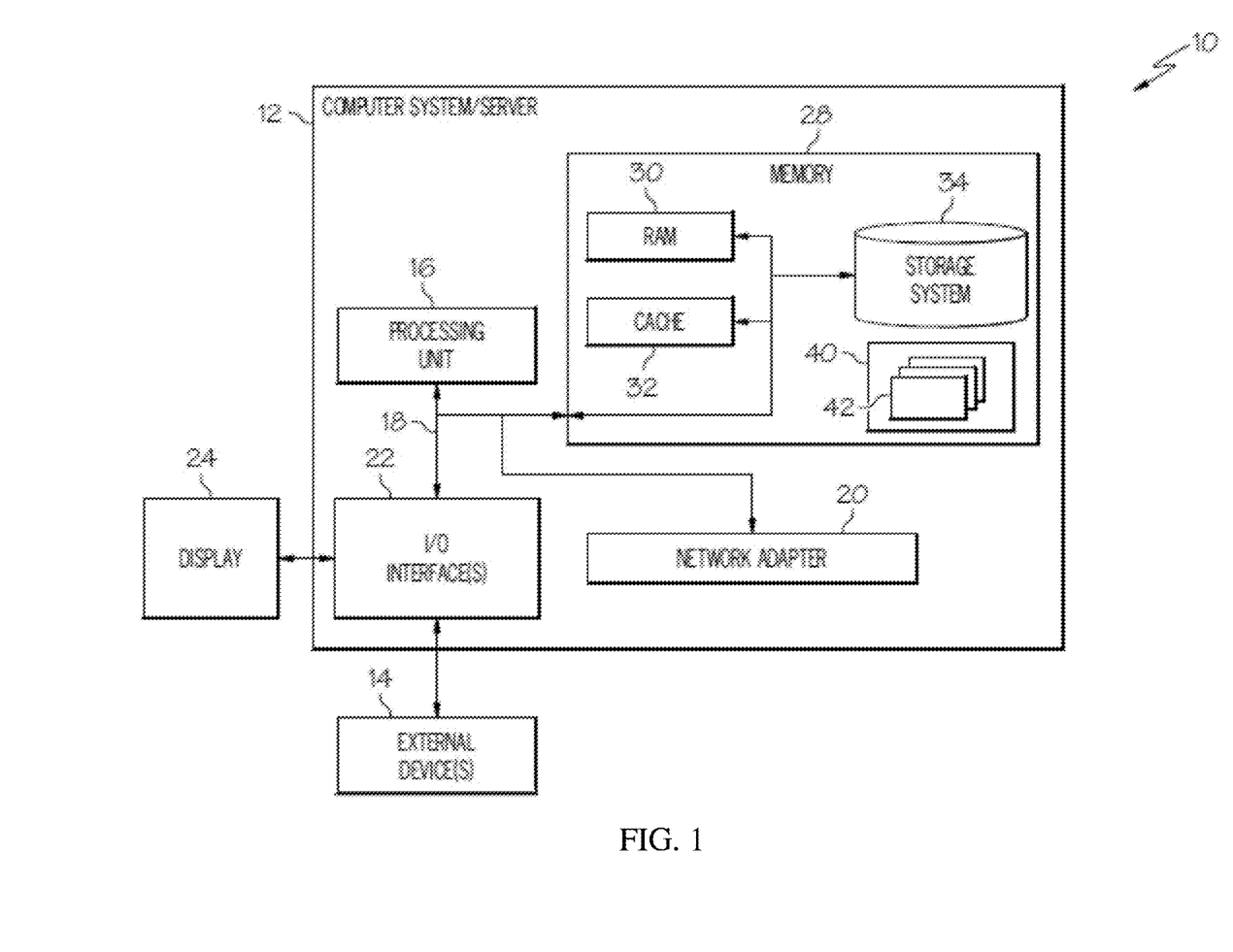
FIG. 1 depicts a cloud computing node according to an embodiment of the disclosure.

Referring now to FIG. 1, a block diagram of a cloud computing node for identifying redundant data for disk image streaming of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
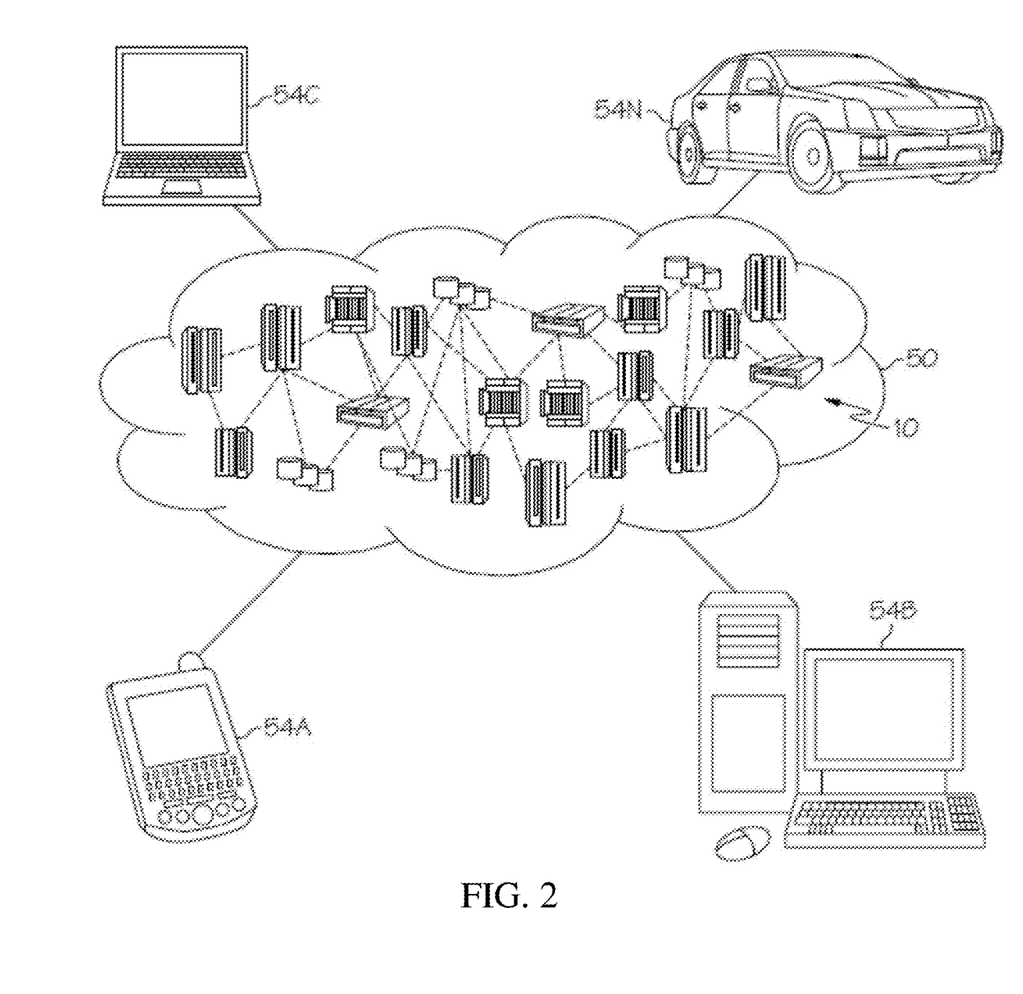
FIG. 2 depicts a cloud computing environment according to an embodiment of the disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
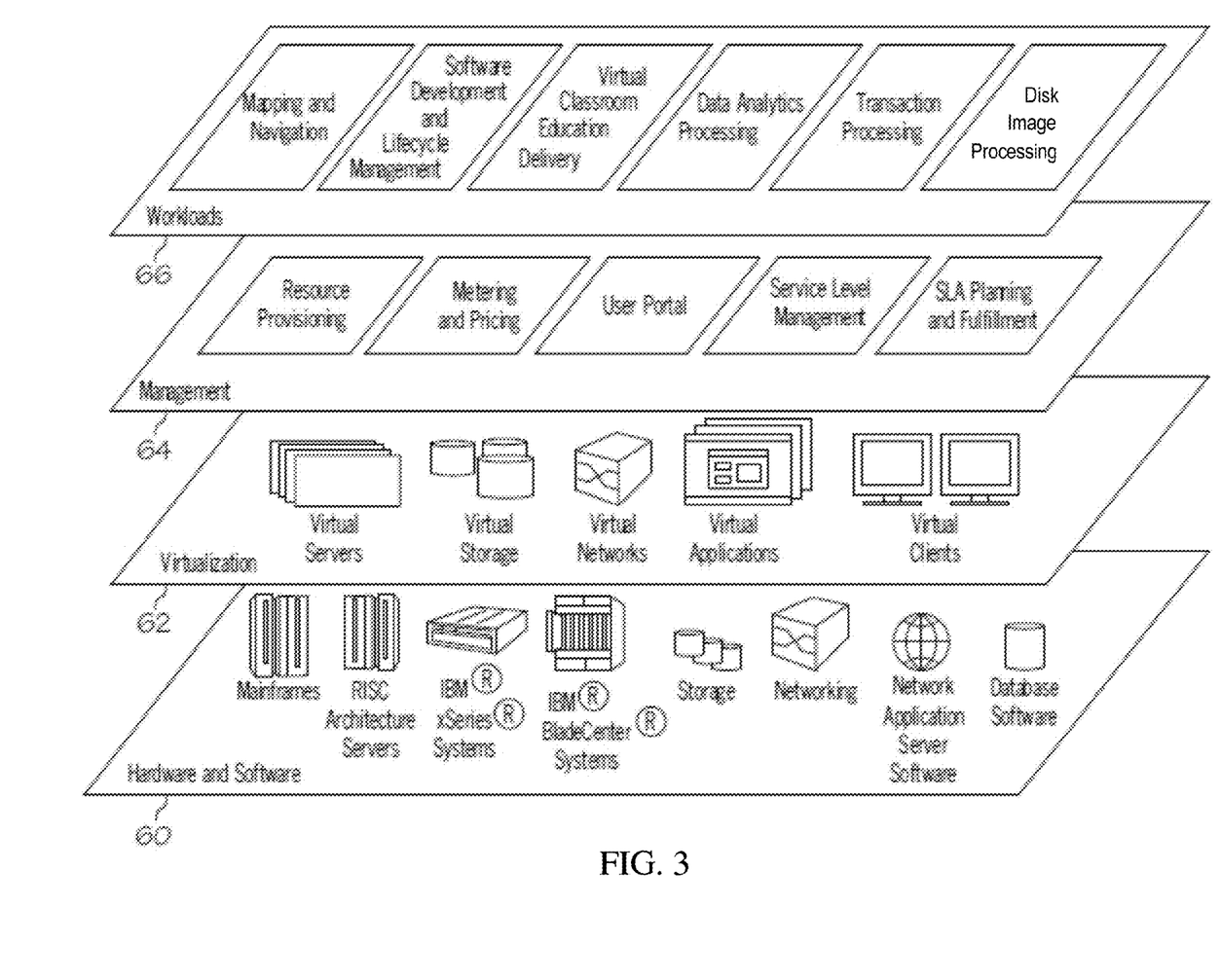
FIG. 3 depicts abstraction model layers according to an embodiment of the disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and disk image streaming processing.

Figure 4:
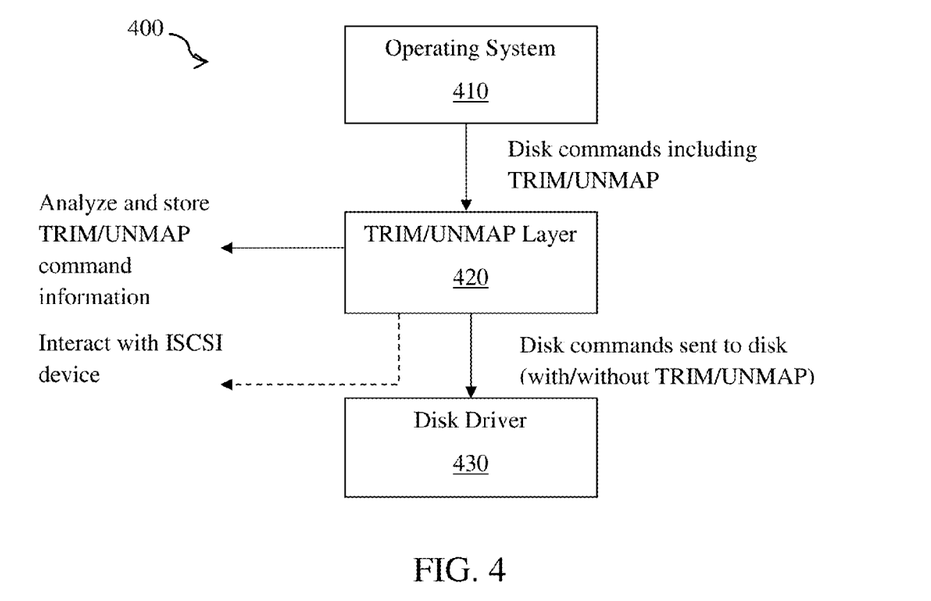
FIG. 4 depicts a flow diagram of a method for identifying redundant data from a streaming disk image by obtaining commands indicating unused disk blocks (TRIM/UNMAP command information) according to an embodiment.

With reference now to FIG. 4, an embodiment of a method 400 for identifying redundant data from a streaming disk image by obtaining commands indicating unused disk blocks is shown. According to an embodiment, a disk image is streamed from a source computer to a target computer. The source computer of an embodiment may be a server in the cloud. The streaming disk image is presented to an operating system 410 as a simulated SSD, thereby introducing a layer that obtains information about unused blocks 420 above the operating system's disk driver 430. That is, a TRIM/UNMAP layer 420 presents to the operating system 410 that the underlying disk is a SSD and provides TRIM/UNMAP support. The TRIM/UNMAP layer 420 may be integrated with a virtualization infrastructure or added between the operating system 410 and the virtualization infrastructure according to an embodiment. The TRIM/UNMAP layer 420 of an embodiment adds support for the TRIM/UNMAP commands independent of whether the commands are already supported by the disk driver 430. In an embodiment the operating system 410 may issue TRIM/UNMAP commands independently of whether the underlying disk device driver 430 supports such commands. However, providing the TRIM/UNMAP layer 420 as part of a lower level disk driver 430 an embodiment does not require modification of the operating system 410.

Because the TRIM/UNMAP layer 420 is presented as a simulated SSD, the operating system recognizes the TRIM/UNMAP layer 420 as a SSD and can issue TRIM/UNMAP commands to identify which blocks of the streamed disk image are not used by the operating system 410. In other words, the operating system 410 issues TRIM/UNMAP commands to identify blocks that a SSD would normally use for garbage collection. These blocks are free disk space and are never read again by the operating system 410.

According to an embodiment, the TRIM/UNMAP command information regarding the unused or unallocated blocks is analyzed and recorded in a log or metadata file. The log or metadata file may be kept in addition to the disk image or as part of the disk image. This information regarding the unallocated blocks is sent to the server to be maintained and analyzed for more efficient streaming of disk images in the future. The TRIM/UNMAP commands received by the TRIM/UNMAP layer 420 may also be passed to the disk driver 430.

By adding the TRIM/UNMAP layer 420 between the operating system 410 and the disk driver 430, an embodiment can identify which blocks of a streamed disk image are not used by the operating system 410. These unallocated blocks are recorded in a log or metadata file for future reference. Accordingly, when subsequently streaming the disk image from one computer, such as a cloud server, to another computer, only the blocks that are not listed in the metadata file need to be streamed.

Figure 5:
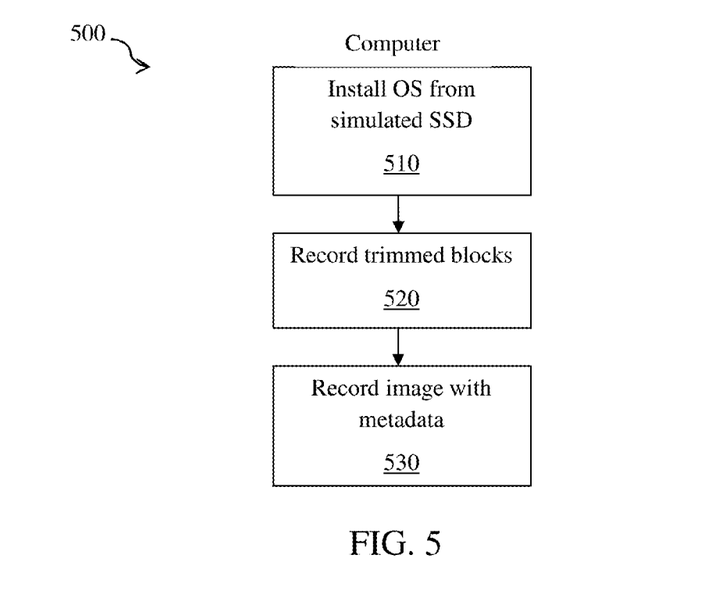
FIG. 5 depicts a flow diagram of a disk image preparation method according to an embodiment.

FIG. 5 depicts a flow diagram of a disk image preparation method 500 according to an embodiment. In block 510, a server or client computer installs an operating system 410 on a simulated SSD. Because the TRIM/UNMAP layer 420 is already present on the freshly installed operating system 410, the unallocated or unused blocks are identified and trimmed. The trimmed blocks are recorded in a log or a metadata file in block 520. In block 530, a disk image is recorded with the log or metadata file according to an embodiment.

The TRIM/UNMAP layer 420 may also perform other tasks including, but not limited to, the streaming functionality itself. This is shown by the dotted arrow in FIG. 4. For instance, the TRIM/UNMAP layer 420 may interact with the disk image from the cloud server via the internet small computer system interface (iSCSI) networking standard according to an embodiment. Streaming may be performed in two ways according to an embodiment. The streaming may be performed unidirectionally, where the image is only transferred from the server to the client (e.g., during provisioning), or bidirectionally, where all changes to the disk image applied on the client side are also to be applied to the copy of the disk image in the server.

Figure 6:
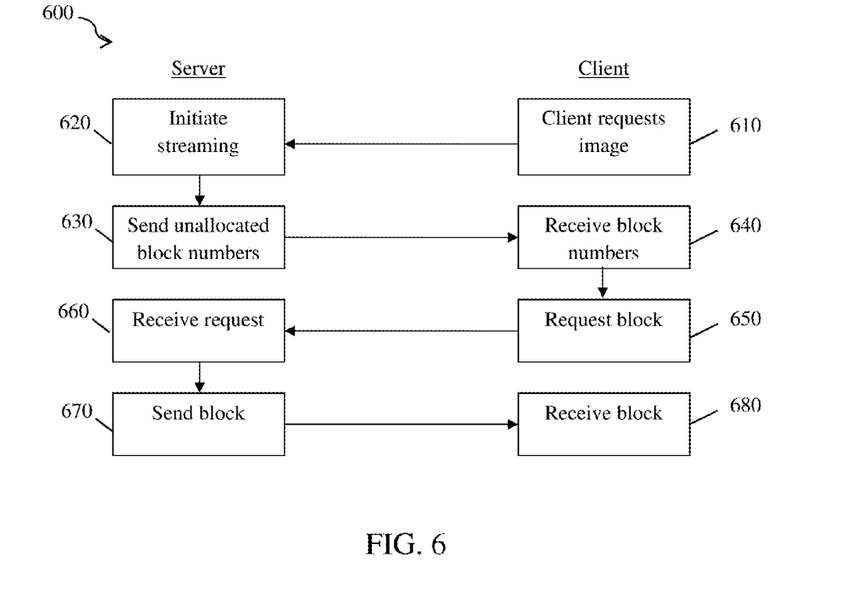
FIG. 6 depicts an excerpt of a possible flow for unidirectionally streaming a disk image according to an embodiment.
Figure 7:
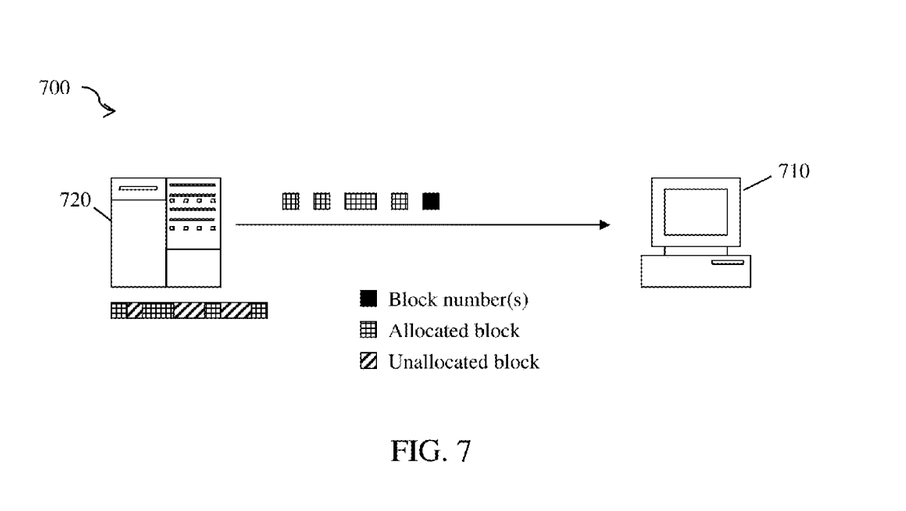
FIG. 7 depicts a diagrammatic representation of a unidirectional streaming of a disk image according to an embodiment.

Referring to FIGS. 6 and 7, a workflow 600 and diagrammatic representation 700 of a unidirectional streaming of a disk image according to an embodiment is shown. Once the disk image is completed as shown in FIG. 5, the disk image may be streamed to a client 710 from a server 720. In block 610, the client 710 requests the disk image from the server 720. The server 720 initiates the streaming of the disk image as shown in block 620. In block 630, the server 720 informs the client 710 about the unallocated blocks. For example, the server 720 may send a list of unallocated block numbers to the client 710. In block 640, the client 710 receives the list of unallocated blocks. Once the client 710 knows the blocks that are not in use, the client 710 will start requesting allocated blocks only, as shown in block 650. The server 720 receives the client's request for allocated blocks in block 660 and sends the allocated blocks to the client 710 in block 670. The client 710 then receives the allocated blocks sent from the server 720, as shown in block 680.

Figure 8:
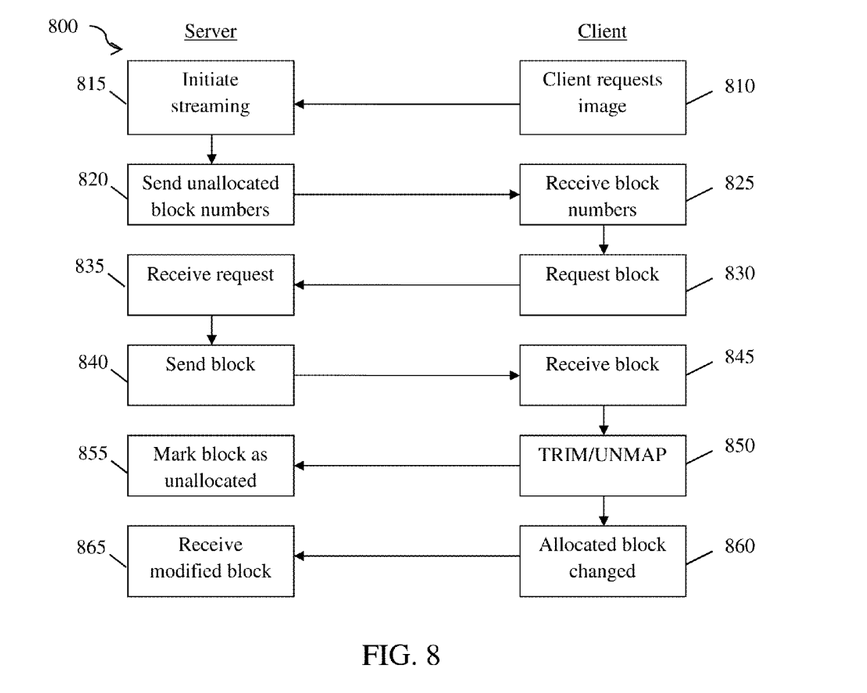
FIG. 8 depicts an excerpt of a possible flow for bidirectionally streaming a disk image according to an embodiment.
Figure 9:
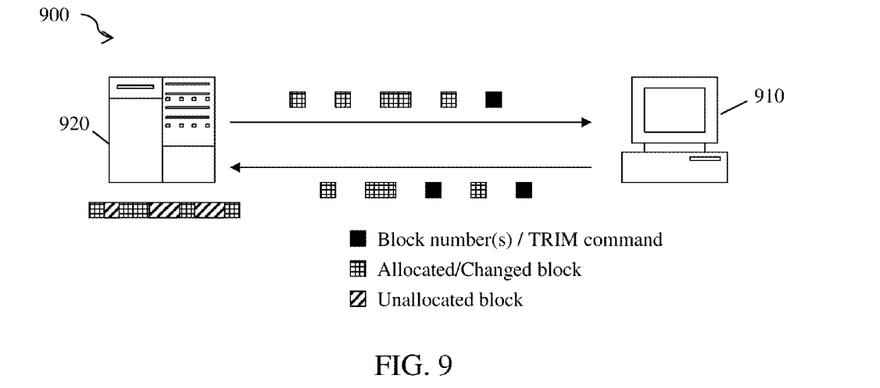
FIG. 9 depicts a diagrammatic representation of a bidirectional streaming of a disk image according to an embodiment.

Referring to FIGS. 8 and 9, a workflow 800 and diagrammatic representation 900 of a bidirectional streaming of a disk image according to an embodiment is shown. In block 810, the client 910 requests the disk image from the server 920. The server 920 initiates the streaming of the disk image as shown in block 815. In block 820, the server 920 informs the client 910 about the unallocated blocks. For example, the server 920 may send a list of unallocated block numbers to the client 910. In block 825, the client 910 receives the list of unallocated blocks. Once the client 910 knows the blocks that are not in use, the client 910 will start requesting allocated blocks only, as shown in block 830. The server 920 receives the client's request for allocated blocks in block 835 and sends the allocated blocks to the client 910 in block 840. The client 910 then receives the allocated blocks sent from the server 920, as shown in block 845.

In block 850, the client 910 also has to simulate an SSD to the operating system 410 to introduce the TRIM/UNMAP layer 420 and pass blocks that are identified and recorded as unused or unallocated back to the server 920. This scenario may occur when files are deleted, for example. The server 920 then marks these blocks as unallocated on the stored disk image, as shown in block 855. Upon reception, the server 920 is able to update the metadata of the disk image and therefore correctly maintain information about unallocated blocks and pass that information on to another client that may wish to stream the same disk image. In block 860, when an allocated block is changed or modified by the client 910, the allocated block is sent to the server 920. The server 920 receives the modified block and records the modified block on the stored disk image, as shown in block 865. The ordering shown in the FIGS. 6-9 are exemplary, and only an excerpt of the entire interaction between a client and a server. Typically, a client would send multiple requests about unused blocks and modified blocks in any order. Also, the information about the unused blocks does not have to be sent at the beginning but could be split up over the course of the communication.

According to embodiments, a disk image can be streamed more efficiently if the redundant blocks of a disk image are identified and not streamed to a client device. Therefore, embodiments are useful for cloud environments that stream images (i.e., start operating systems while they are being provisioned) and cloud environments that first copy the image and subsequently start the operating systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the disclosure illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   adding, by a first processing device, a TRIM/UNMAP layer between an operating system and a disk driver to support TRIM/UNMAP commands;
   utilizing the TRIM/UNMAP layer, by the first processing device, to identify blocks of a disk image that are unallocated by the operating system as identified unallocated blocks;
   sending, by the first processing device, a list of the identified unallocated blocks to a second processing device;
   in response to receiving the list of the identified unallocated blocks, identifying, by the second processing device, allocated blocks from the list of the identified unallocated blocks;
   sending, by the second processing device, a request for only the allocated blocks to the first processing device;
   receiving, by the first processing device, a request for only allocated blocks from the second processing device, the allocated blocks being from sections of the disk image not included in the list of the identified unallocated blocks;
   transferring, by the first processing device to the second processing device, the allocated blocks in response to the request for the only allocated blocks;
   simulating, by the second processing device, the operating system to introduce the TRIM/UNMAP layer on the second processing device and send a second list of identified unallocated blocks to the first processing device; and
   marking, by the first processing device, blocks of the disk image based on the second list of identified unallocated blocks to maintain information for subsequent client use.

2. The method of claim 1, wherein the TRIM/UNMAP layer is presented to the operating system as a simulated solid-state drive.

3. The method of claim 1, wherein the identified unallocated blocks are recorded in a log or metadata file associated with the disk image.

4. The method of claim 1, wherein the TRIM/UNMAP layer is utilized to stream image data unidirectionally or bidirectionally between the first processing device and the second processing device.

5. The method of claim 1, wherein the TRIM/UNMAP commands are integrated into the operating system independently of the disk driver.

6. The method of claim 1, further comprising:
   receiving, by the first processing device, a request for the disk image from the second processing device; and
   in response to the request for the disk image, sending the list of the identified unallocated blocks to the second processing device by the first processing device.

7. The method of claim 1, further comprising:
   receiving, by the first processing device, from the second processing device blocks that are identified as unallocated via the TRIM/UNMAP layer due to deletion by the second processing device from a simulated solid-state drive.

8. The method of claim 1, further comprising:
   identifying, by the first processing device, portions of the disk image for streaming in accordance with the allocated blocks; and
   streaming, by the first processing device, the portions of the disk image to the second processing device.

9. The method of claim 1, further comprising:
   receiving, by the first processing device, a second list of identified unallocated blocks from the second processing device, the second list of identified unallocated blocks being derived by a second TRIM/UNMAP layer of the second processing device.

10. The method of claim 1, wherein the second list of identified unallocated blocks include blocks that are identified and recorded as unused or unallocated.

11. A computer program product, the computer program product comprising a non-transitory computer readable storage medium having program instructions embodied therewith, the program instructions executable by a first processing device and asecond processing device to cause:
    adding, by the first processing device, a TRIM/UNMAP layer between an operating system and a disk driver to support TRIM/UNMAP commands;
    utilizing the TRIM/UNMAP layer by the first device, to identify blocks of a disk image that are unallocated by the operating system as identified unallocated blocks;
    sending, by the first processing device, a list of the identified unallocated blocks to the second processing device;
    in response to receiving the list of the identified unallocated blocks, identifying, by the second processing device, allocated blocks from the list of the identified unallocated blocks;
    sending, by the second processing device, a request for only the allocated blocks to the first processing device;
    receiving, by the first processing device, -a request for only allocated blocks from the second processing device, the allocated blocks being from sections of the disk image not included in the list of the identified unallocated blocks;
    transferring, by the first processing device to the second processing device, the allocated blocks in response to the request for the only allocated blocks;
    simulating, by the second processing device, the operating system to introduce the TRIM/UNMAP layer on the second processing device and send a second list of identified unallocated blocks to the first processing device; and marking, by the first processing device, blocks of the disk image based on the second list of identified unallocated blocks to maintain information for subsequent client use.

12. The computer program product of claim 11, wherein the TRIM/UNMAP layer is presented to the operating system as a simulated solid-state drive.

13. The computer program product of claim 11, wherein the sending of the list of the identified unallocated blocks causes the second processing device to identify and to transmit the allocated blocks to the first processing device.

14. The computer program product of claim 11, wherein the identified unallocated blocks are recorded in a log or metadata file associated with the disk image.

15. The computer program product of claim 11, wherein the TRIM/UNMAP layer is utilized to stream image data unidirectionally or bidirectionally between the first processing device and the second processing device.

16. The computer program product of claim 11, wherein the TRIM/UNMAP commands are integrated into the operating system independently of the disk driver.

17. The computer program product of claim 11, wherein the program instructions are further executable by the first processing device to cause the first processing device to:
receive a request for the disk image from the second processing device; and
in response to the request for the disk image, sending the list of the identified unallocated blocks to the second processing device by the first processing device.

18. The computer program product of claim 11, wherein the program instructions are further executable by the first processing device to cause the first processing device to:
receive from the second processing device blocks that are identified as unallocated via the TRIM/UNMAP layer due to deletion by the second processing device from a simulated solid-state drive.

19. The computer program product of claim 11, wherein the program instructions are further executable by the first processing device to cause the first processing device to:
identify portions of the disk image for streaming in accordance with the allocated blocks; and
stream the portions of the disk image to the second processing device.

20. The computer program product of claim 11, wherein the second list of identified unallocated blocks include blocks that are identified and recorded as unused or unallocated.

\* \* \* \* \*